United States Patent
Korchemny et al.

(10) Patent No.: US 11,386,250 B2
(45) Date of Patent: Jul. 12, 2022

(54) DETECTING TIMING VIOLATIONS IN EMULATION USING FIELD PROGRAMMABLE GATE ARRAY (FPGA) REPROGRAMMING

(71) Applicant: Synopsys. Inc., Mountain View, CA (US)

(72) Inventors: Dmitry Korchemny, Herzliya (IL); Nathaniel Azuelos, Modiin (IL); Boris Gommershtadt, Herzliya (IL); Alexander Shot, Haifa (IL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/159,056

(22) Filed: Jan. 26, 2021

(65) Prior Publication Data

US 2021/0232742 A1     Jul. 29, 2021

Related U.S. Application Data

(60) Provisional application No. 62/966,822, filed on Jan. 28, 2020.

(51) Int. Cl.
    *G06F 30/3312*     (2020.01)
    *G06F 30/34*     (2020.01)
    *G06F 119/12*     (2020.01)

(52) U.S. Cl.
    CPC .......... *G06F 30/3312* (2020.01); *G06F 30/34* (2020.01); *G06F 2119/12* (2020.01)

(58) Field of Classification Search
    USPC ........................................................ 716/113
    See application file for complete search history.

(56) References Cited

U.S. PATENT DOCUMENTS

| | | | |
|---|---|---|---|
| 2003/0144828 A1* | 7/2003 | Lin .................. | G06F 30/331 703/21 |
| 2005/0228630 A1* | 10/2005 | Tseng .................. | G06F 30/33 703/19 |
| 2006/0117274 A1* | 6/2006 | Tseng .................. | G06F 30/331 716/106 |
| 2011/0307233 A1* | 12/2011 | Tseng .................. | G06F 30/331 703/14 |
| 2021/0232742 A1* | 7/2021 | Korchemny ........ | G06F 30/3312 |

* cited by examiner

*Primary Examiner* — Mohammed Alam
(74) *Attorney, Agent, or Firm* — Weaver Austin Villeneuve & Sampson LLP

(57) ABSTRACT

A method of detecting a timing violation between a first sequential element and a second sequential element in a circuit design being emulated in a hardware emulation system includes, in part, determining a timing relationship between first and second clocks applied respectively to the first sequential element and the second sequential element, reconfiguring a combinational logic disposed between the first sequential element and the second sequential element as one or more buffers, setting a delay across the one or more buffers to one or more clock cycles of the hardware emulation system based on the timing relationship, reprogramming the first and second clocks in accordance with the delay, and detecting a timing violation if a change in an output of the first flip-flop is not stored in the second flip-flop within the delay.

20 Claims, 8 Drawing Sheets

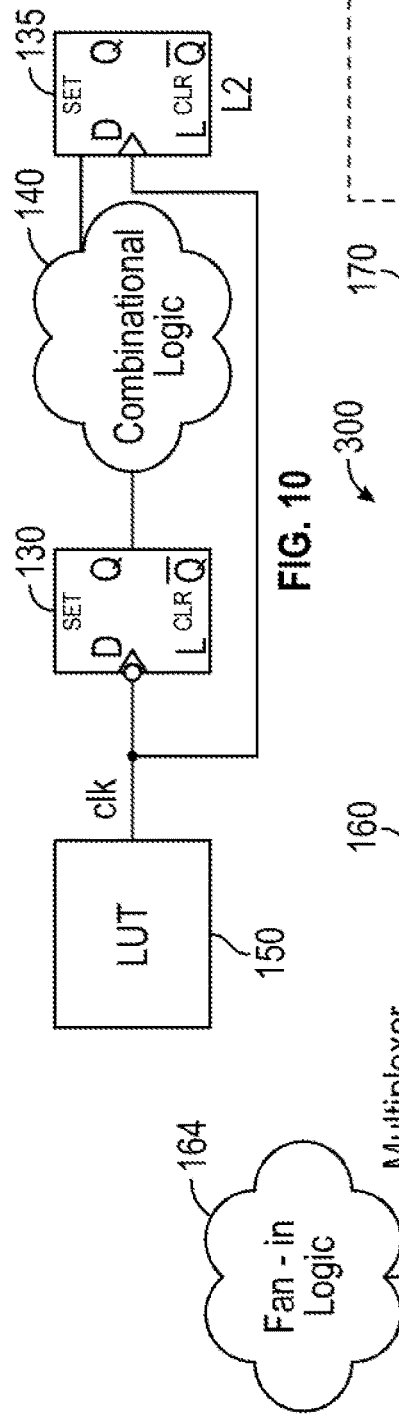
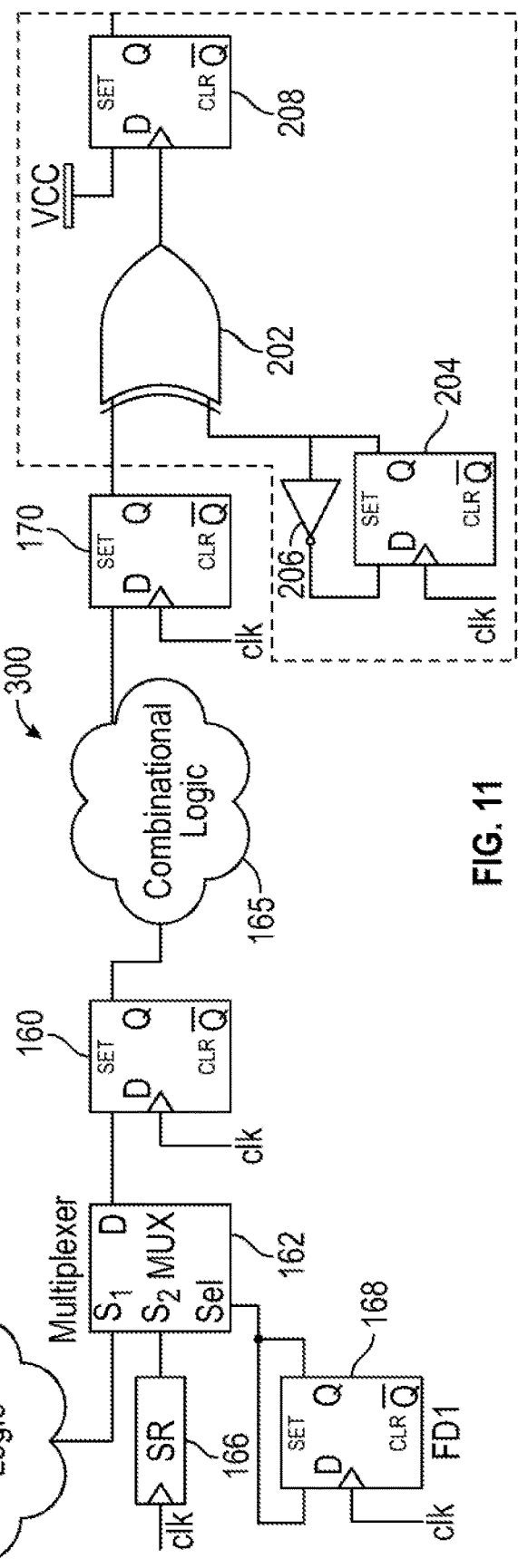
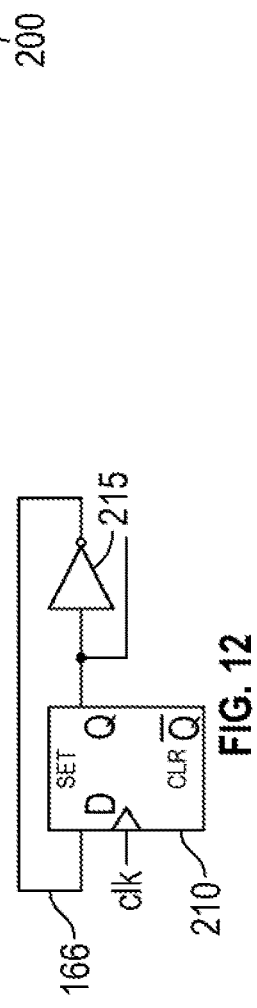
FIG. 10
FIG. 11
FIG. 12

DETECTING TIMING VIOLATIONS IN EMULATION USING FIELD PROGRAMMABLE GATE ARRAY (FPGA) REPROGRAMMING

RELATED APPLICATION

The present application claims benefit under 35 USC 119(e) of U.S. Application Ser. No. 62/966,822 filed Jan. 28, 2020, entitled "Detecting Timing Violations In Emulation Using FPGA Reprogramming", the content of which is incorporated herein by reference in its entirety.

TECHNICAL FIELD

The present disclosure relates to a hardware emulation system, and more particularly, to a system and method for detecting timing violations in emulation using field programmable gate array (FPGA) reprogramming.

BACKGROUND

Hardware emulation of an integrated circuit (IC) is known to behave non-deterministically. Therefore, running the same test may yield different results at different times. Often, the non-determinism is caused by erroneous test behavior or by wrong timing specifications, such as erroneous false timing paths. In other cases, such behavior is caused by mistakes in timing path computation in the emulator.

To detect timing violations, such as a wrong signal setup time, the design undergoing emulation may by instrumented with additional hardware to check signal stability during the setup time. However, such an approach has a number of drawbacks. The insertion of additional hardware may negatively affect emulation capacity. Furthermore, the added hardware monitors emulation correctness in runtime and on specific testbenches and thus does not check the timing validity exhaustively. Moreover, the added hardware only monitors the signal stability. It may happen that the signal is stable during a time window, but its value is incorrect because the timing delay is too large. Though such errors may be detected by functional tests, they may remain unnoticed or difficult to debug.

SUMMARY

In accordance with one embodiment of the present disclosure a method of detecting a timing violation between a first sequential element and a second sequential element in a circuit design being emulated in a hardware emulation system includes, in part, determining a timing relationship between first and second clocks applied respectively to the first sequential element and the second sequential element, reconfiguring a combinational logic disposed between the first sequential element and the second sequential element as one or more buffers, setting a delay across the one or more buffers to one or more clock cycles of the hardware emulation system based on the timing relationship, reprogramming the first and second clocks in accordance with the delay, and detecting a timing violation if a change in an output of the first flip-flop is not stored in the second flip-flop within the delay.

A non-transitory computer readable medium, in accordance with one embodiment of the present disclosure, includes, in part, stored instructions which when executed by a processor, cause the processor to determine a timing relationship between first and second clocks applied respectively to the first sequential element and the second sequential element, reconfigure a combinational logic disposed between the first sequential element and the second sequential element as one or more buffers, set a delay across the one or more buffers to one or more clock cycles of the hardware emulation system based on the timing relationship, reprogram the first and second clocks in accordance with the delay, and detect a timing violation if a change in an output of the first flip-flop is not stored in the second flip-flop within the delay

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 10 shows a LUT providing an input to a logic circuit.

FIG. 11 shows a logic circuit adapted to generate stimuli and check the data path timing between a pair of flip-flops, in accordance with one embodiment of the present disclosure.

FIG. 12 is a block diagram of a stimuli generator, in accordance with one embodiment of the present disclosure.

DETAILED DESCRIPTION

Figure 1:
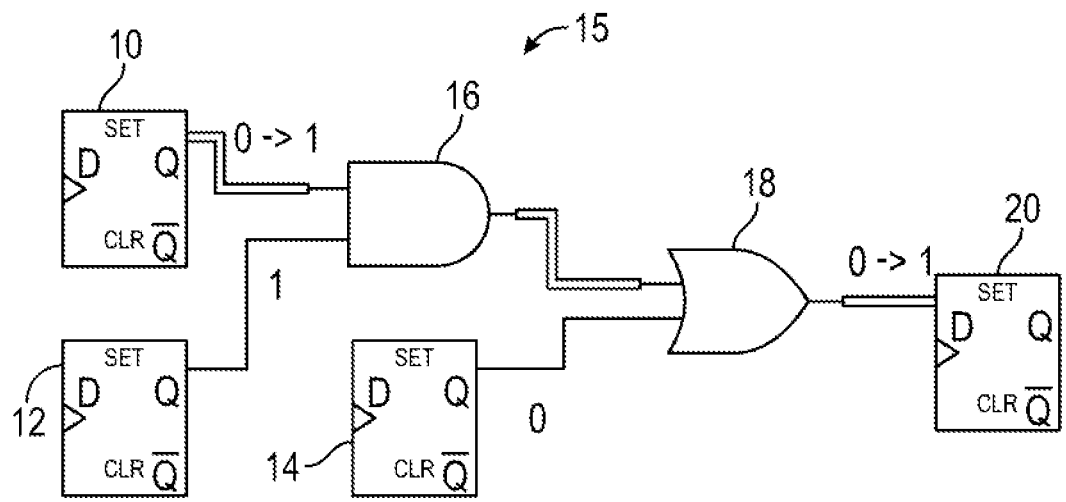
FIG. 1 shows an example of a logic circuit emulated by a hardware emulation system.

In accordance with the present disclosure, prior to performing a hardware emulation of an integrated circuit (IC)

design, the delay between sequential logic elements (such as flip-flops and latches) disposed in signal paths are checked for possible timing violations. As described further below, embodiments of the present disclosure achieve, among other advantages, runtime reprogramming of lookup tables (LUT) for timing path sensitization, adoption of automatic test pattern generation (ATPG) for reprogrammable LUTs during the runtime, emulation clock reprogramming, test compression, minimal instrumentation capacity and routing overhead, as well as independence from a user testbench.

Embodiments of the present disclosure are applicable to emulators for implementing combinational logic with reprogrammable LUTs, such as FPGA-based emulators. An emulator often includes an emulation clock having a period that defines an emulation clock (EC) cycle and is considered the fastest clock. The emulation clock operates as a system clock for the device/design under test (DUT). In one embodiment, all signal changes, including user specified clocks, are synchronized to the EC. When the emulation is stopped, the emulator facilitates the reading of the value of the registers using, for example, a readback via a scan output, and a writing of a desired value to registers using, for example, a writeback via a scan input. In one embodiment an emulator is FPGA-based, and reference is made to the emulator blocks as FPGA blocks or FPGAs. It is understood, however, that embodiments of the present disclosure are applicable to any emulator or to any FPGA system that has a reference clock.

In accordance with the present disclosure, signal paths having timings that should be verified are identified, and tests configured to verify the timing behavior of such paths are automatically developed. Lookup tables (LUTs) associated with paths so identified may be reprogrammed. The clocks controlling the registers on the path boundaries are also reprogrammed to correspond to the timing budget of the path. To reduce the number of tests, several paths may be stitched together. The stitched paths may then be combined into groups so that the tests are generated for the stitched paths. All paths in a group are mutually disjoint.

The tests are then implemented during emulation. In one embodiment, all the tests associated with the same group of paths may be applied and run concurrently. A difference between the actual and the expected results indicates a timing violation in the stitched path. The timing violations may then be automatically refined to pinpoint the offending path.

Timing Path Selection

In an IC design, the number of combinational paths is often very large. Therefore, checking for timing violations in all the paths is often impractical. Usually, it is sufficient to check timing violations of paths crossing the FPGA boundaries (inter-FPGA paths). The intra-FPGA path delays are typically accurately computed by FPGA place and route tools and thus are negligible relative to the inter-FPGA path delays. To further minimize the total number of paths, it is possible, for example, to include only paths having multiple hops between the FPGAs, as well as between other units or boards. The description below is provided with reference to detecting the timing violation of inter-FPGA paths. However, it is understood that timing violation detection, in accordance with embodiments of the present disclosure, may be applied to any paths.

Timing Path Sensitization

A timing violation is detected when a signal arrives at a sequential logic element of a sensitized path either (i) too late thus causing setup time violation or (ii) too early thus causing hold time violation Critical path sensitization is used in generating test patterns based on Automatic Test Pattern Generation (ATPG) technique. Path sensitization requires the setting of all external inputs of the gates disposed in a path to values that allow signal propagation to occur throughout the entirety of that path.

FIG. 1 shows an example of a logic circuit 15 being emulated by a hardware emulator (alternatively referred to herein as an emulator). To check for possible timing violations along the path between flip-flops 10 and 20, the output of flip-flop 10 may be set to a first state (e.g., a low logic level (also referred to as "0" herein) initially. During the next clock cycle, the output of flip-flop 10 may be changed to a second state (e.g., a high logic level (also referred to as "1" herein) in order to determine how the change in the output of flip-flop 10 propagates to the output of flip-flop 20. To achieve this, the output of flip-flop 12 should be set to 1 so that AND gate 16 becomes responsive only to changes in the output of flip-flop 10, and the output of flip-flop 14 set to 0 so that OR gate 18 becomes responsive only to the output of AND gate 16. If the output of flip-flop 20 remains at 0 and does not change to 1, then the path delay between flip-flops 10 and 20 is larger than the delay predicted by a timing analysis. As described above, the setting of the output values of flip-flop 10, 12 and 14 may be achieved using a writeback operation during which the desired value is written to flip-flop 10 via a scan-in input terminal (not shown) and values of 1 and 0 are written to flip-flops 12 and 14 respectively via their respective scan-in input terminals (not shown). Similarly, the reading of the output value of flip-flop 20 is achieved using a readback operation during which the output value of flip-flop 20 is read using a scan-out output terminal (not shown).

In accordance with one aspect of the present disclosure, all combinational logic gates and LUTs disposed in a path undergoing timing violation check are transformed into buffers. However, it is understood that any other suitable transformation may also be used. For example, in one embodiment, the logic gates and LUTs may be transformed into an inverter chain. Since the LUT timing is independent of its logic function, such transformation does not affect the timing being checked.

Figure 2:
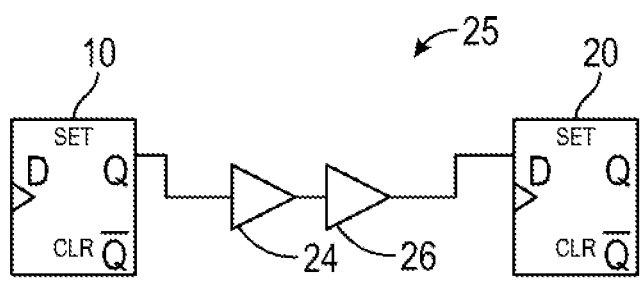
FIG. 2 shows the transformation of the circuit of FIG. 1, in accordance with one embodiment of the present disclosure.

FIG. 2 shows the transformation of the circuit of FIG. 1 after gates 16 and 18 are replaced with buffers 24 and 26 respectively. Because the output values of flip-flops 12 and 14 are set to 1 and 0 respectively, flip-flops 12 and 14 do not affect the timing path between flip-flops 10 and 20 and thus are not shown. The transformation of circuit 15 to circuit 25, as shown in FIG. 2, sensitizes the path between flip-flops 10 and 20 and therefore enables the detection of possible timing violations along the path.

Clock Analysis

Figure 3:
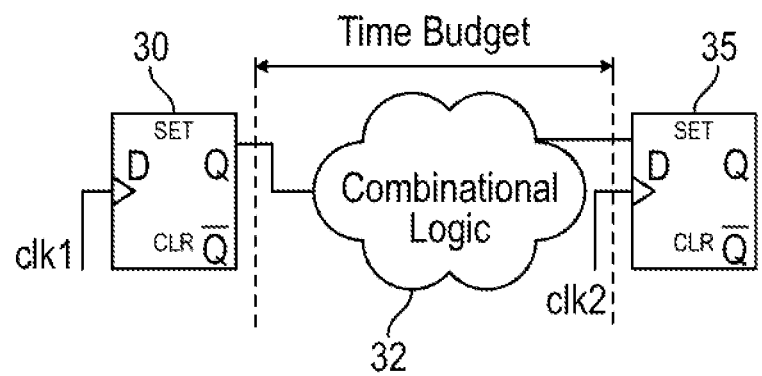
FIG. 3 shows an example of a logic circuit emulated by a hardware emulation system.

In order to detect a timing violation in a path between two sequential elements, the sequential element clocks must be consistent with the available time budget. FIG. 3 shows a pair of flip flops 30 and 35 and a combinational logic 32 disposed therebetween. For example, if the path delay across combinational logic 32 is 2.1 EC cycles, and the available time budget for the worst-case timing between a positive edge of clock clk1 and the next positive edge of clock clk2 is 2 EC cycles, a timing violation exists in the path between flip-flops 30 and 32. However, if the delay time between the edges of clocks clk1 and clk1 during the test execution is at least 4 EC cycles, no timing violation will be detected. A timing violation is therefore detected if both clocks clk1 and clk2 have the same pattern and a period of 2 EC cycles. Each clock signal has a pattern defined by the clock's high level durations and low level durations. Both the high and low level durations are defined as multiples of EC cycles. A clock pattern defined, for example, by 001, indicates that the clock is at a low level for two EC cycles, and is then at a high level for one EC cycle.

In accordance with one aspect of the present disclosure, to set the time budget across a combination logic, the following rules defining the timing relationship between the clocks are applied. If the clocks (such as clocks clk1 and clk2 shown in FIG. 3) applied to the pair of flip-flops separated by a combinational logic are not synchronous with respect to one another (i.e., they are not synphase clocks), the time budget (also referred to herein as path time budget) across the combinational logic (such as combinational logic 32 of FIG. 3), is set to one EC cycle. If the clocks applied to the pair of flip-flops are synchronous with respect to one another, the path time budget across the combinational logic separating the two flip-flops is set to 2 EC cycles.

If the clocks applied to a pair of flip-flops separated by a combinational logic are independent clocks, the path time budget across the combinational logic is set to one EC cycle. If the clocks applied to a pair of flip-flops separated by a combinational logic are the same clock, the path time budget across the combinational logic is set to at least 2 EC cycle. If it cannot be determined in advance whether the path across the combinational logic is a single-EC cycle path or a multi-EC cycle path, the path time budget across the combinational logic is set to n EC cycles, where n represents the period of the synphase clocks in EC cycles.

In accordance with the present disclosure, after setting the path time budget across the combinational logic of a path, the clock signals of the sequential elements disposed in the path are reprogrammed/modified so as to be consistent with the assigned path time budget, as described further below. Referring to FIG. 3, if the path time budget across the combinational logic 32 is set to 1 EC cycle, both clocks clk1 and clk2, whose edges are not aligned, are reprogrammed to have a period of 1 EC cycle. If the path time across the combinational logic is set to be n>1 EC cycles, both clocks clk1 and clk2 are reprogrammed to have the same pattern such that their low phases (the periods during which the clock is at a low level) are k EC cycles, and their high phases (the periods during which the clock is at a high level) are (n–k) EC cycles, where 0<k<n is an arbitrary integer number.

Figure 4:
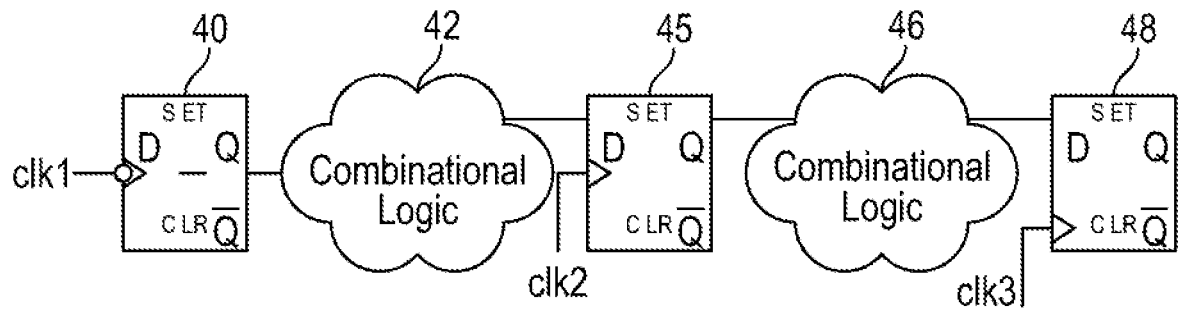
FIG. 4 shows an example of a logic circuit emulated by a hardware emulation system.

If the two consecutive sequential elements are latches, then they are assumed to be antipodal (i.e., when one of the latches is open, the other one is closed), otherwise, they should be considered as a combinational logic. FIG. 4 shows a pair of consecutive latches 40 and 45 that have a combinational logic 42 disposed therebetween. Assume that the time budget across combinational logic 42 is k EC cycles. In accordance with one aspect of the present disclosure, both clocks clk1 and clk2 may be reprogrammed to have the same pattern such that their low phases are k EC cycles. In one embodiment, the clock period n (n>k) is such that n–k is the time budget allocated for the path between latch 45 and the next antipodal latch, such as latch 48 shown as being separated from latch 45 by combinational logic 46. Combinational logic 46 thus has an allocated path time budget of (n–k) EC cycles. For example, if the delay between latches 45 and 48 is 2 EC cycles, then clocks clk2 and clk3 are reprogrammed to have a low phase of 1 EC cycle, and a high phase of 2 EC cycles.

Clock Multiplexing

Figure 5:
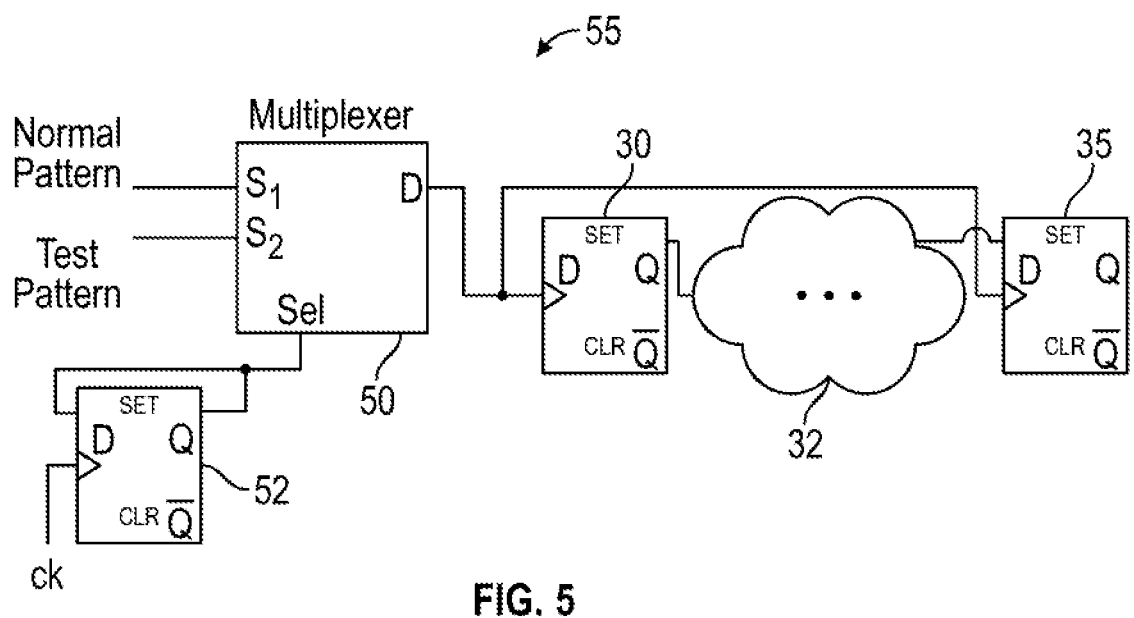
FIG. 5 shown an example of a logic circuit configured to generate a desired clock pattern to detect possible timing violations between the flip-flops disposed in the circuit, in accordance with one embodiment of the present disclosure.

FIG. 5 is an example of a block diagram of a circuit 55 configured to generate a desired clock pattern to detect possible timing violations between flip-flops 30 and 35 disposed in the circuit. Multiplexer 50 is shown as receiving the normal mode clock pattern at its first input terminal $S_1$ and the test mode clock pattern at its second input terminal $S_2$. The normal mode clock pattern is understood to refer to the clock pattern developed to test the DUT under a normal mode of emulation, and the test mode is understood to refer to the clock pattern adapted to check for timing violations, in accordance with embodiments of the present disclosure.

As is shown, the input and output terminals of flip-flop 52 are connected to one another. Accordingly, with each transition of clock signal CK, either a 1 or a 0 is applied to the select terminal Sel of multiplexer 50. To select the normal mode clock pattern, a 0 is written at the output of flip-flop 52 using a write-back. To select the test mode clock pattern, a 1 is written at the output of flip-flop 52 using a write-back.

Clock Reprogramming

To save the overhead associated with clock multiplexing, when there is a combinational path from a primary clock (i.e., the clock which is a primary input to the design) to any given clock, instead of clock multiplexing, one may reprogram the clocking logic to generate the test mode clock pattern. Because all sequential elements present in clock generation are usually implemented as multiplexers in hardware emulation, such a combinational path usually exists depending on the current and sampled values of the signals.

Checking for Timing Violations

Assume that the clocks have been generated/reprogrammed according to the available budget, and timing path sensitization is achieved by reprogramming LUTs into buffers as described above. The duration of the period of a clock clk so generated in terms of EC cycles may be designated below as #clk. In accordance with one embodiment, writeback and readback are performed to check the path timing. In accordance with another embodiment, path timing check is achieve using stimuli generation, as described further below.

Data Path Timing Between Two Consecutive Flip-Flops

Figure 6:
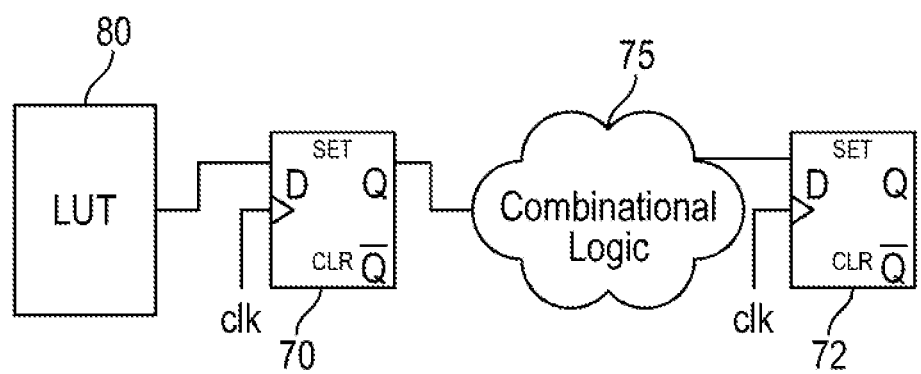
FIG. 6 shows a LUT providing an input to a logic circuit.
Figure 7:
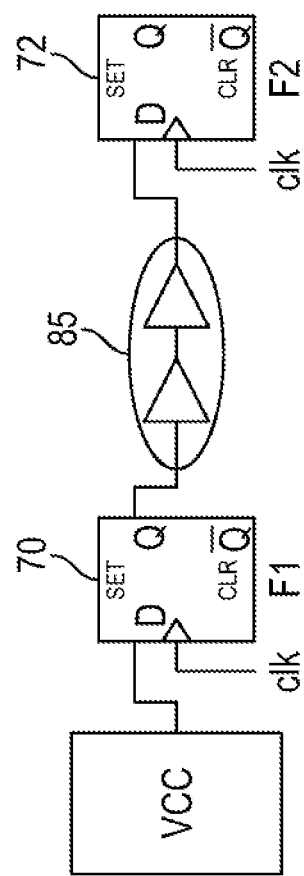
FIG. 7 shows the circuit of FIG. 6 after it is transformed in accordance with one embodiment of the present disclosure.

To check for timing violation across a path disposed between first and second flip-flops, the output values of the flip-flops are initialized, and the input data applied to the first flip-flop is so generated as to cause a difference in the sequence of the output values of the second flip-flop. FIG. 6 shows a LUT 80 providing an input to the first flip-flop 70 that is separated from a second flip-flop 72 by combinational logic 75. FIG. 7 shows the circuit of FIG. 6 after it is transformed in accordance with embodiments of the present disclosure. As is seen from FIGS. 6 and 7, combinational logic 75 is transformed into a buffer chain 85, and LUT 80 is transformed into a constant logic 1 (i.e., supply voltage Vcc).

The path delay between flip-flops 70 and 72 may be detected as follows: (i) set output Q values of both flip-flops to 0 using writeback; (ii) run emulation for 2 EC cycles; and (iii) check the value of output Q of flip-flop 72 using readback. If the output value of flip-flop 72 is 0, a timing error is reported.

If the data input terminal D of flip-flop 70 of FIG. 6 is a primary input (i.e., it is an input of the DUT being emulated), then the input terminal D of flip-flop 70 may be set to a desired value directly through a write-back, or alternatively, the input terminal D of flip-flop 70 may be connected to a feedthrough LUT during the compilation stage. If the input terminal D of flip-flop 70 is connected directly to the output terminal of another sequential element, then input terminal D of flip-flop 70 may be connected to a feedthrough LUT during the compilation stage.

Figure 8:
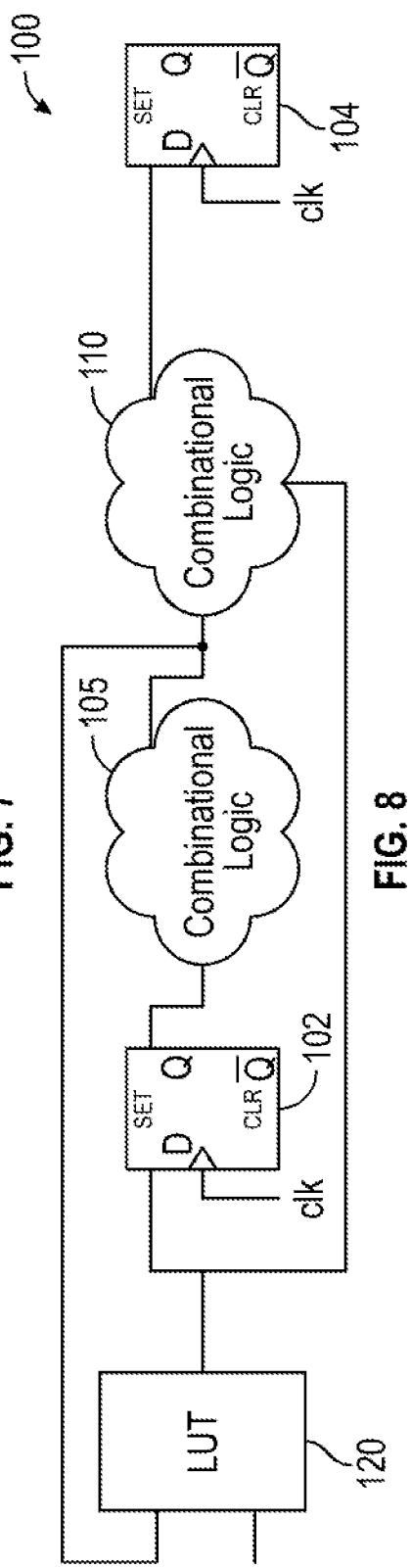
FIG. 8 shows a LUT providing an input to a logic circuit.
Figure 9:
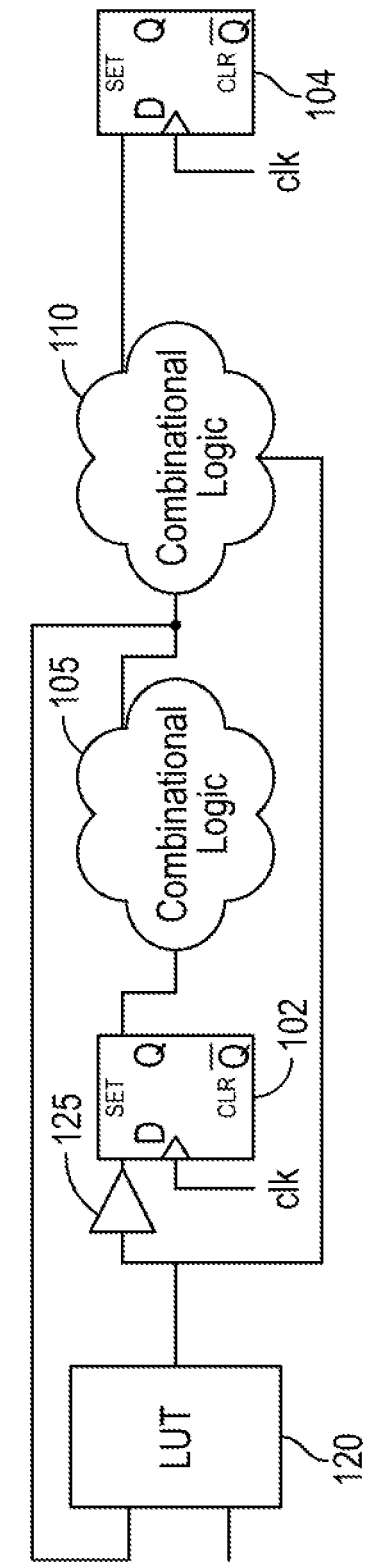
FIG. 9 shows the circuit of FIG. 8 after it is transformed in accordance with one embodiment of the present disclosure.

FIG. 8 shows a logic circuit 100 that includes first and second combinational logic blocks 105 and 110 disposed between first and second flip-flops 102 and 104. A LUT 120 is shown as being connected to (i) the data input terminal of flip-flop 102 and (ii) to an output terminal of combinational logic 105. Accordingly, LUT 120 cannot be reprogrammed to test for timing violation without further modification. To rectify this problem, a buffer 125 is inserted between flip-flop 102 and LUT 120, as shown in FIG. 9. Buffer 125 may then be reprogrammed into a constant signal generator, such as the VCC supply shown in FIG. 7.

If a flip-flop has a set/reset input, the set/reset input is set to an inactive or unasserted state. The timing violations associated with set/reset/enable paths may then be checked as follows. If the set/reset/enable input is synchronous, then it is treated in the same manner as data, however, the actual data input D of the flip-flop is set to an active/asserted value (e.g., 1 for a set, and 0 for a reset). If the set/reset input is asynchronous, it is treated the same way as a clock signal, as described above.

Data Path Timing Between Two Antipodal Latches

Checking the timing of a path between two consecutive antipodal latches, as shown in FIG. 10, is similar to that between two consecutive flip flops. Combinational logic 140 disposed between two latches 130 and 135 is converted to a buffer chain (not shown in FIG. 10). The path delay between latches 130 and 135 may then be checked as follows. Emulation is run for a number of EC cycles required to ensure that latch 130 is closed. Then the output Q of latch 130 is set to, for example, logic 0 using writeback. The output value of latch 130 is then enabled to propagate to the output of latch 135. Next, the data input of latch 130 is set to 1, for example, by connecting it to a supply voltage, as shown in FIG. 7. The emulation is then run for the number of EC cycles corresponding to the clock period of the latches. Next, the value of output Q of latch 135 is read back. If the output value of latch 135 is 0, a timing error is detected. As is the case with flip-flops, the test may be repeated several times. Checking for timing violations for a pair that includes a latch and a flip-flop is performed in a similar manner. Among the advantages of the writeback/readback method are that: (i) in most cases it is non-intrusive and (ii) it provides an accurate indication of the combinational path where a timing violation has occurred.

Checking the Data Path Timing Using Stimuli Generation

An alternative method of checking for data path timing violation is to include additional logic to generate the stimuli and analyze the results. The difference between the actual and the expected results indicates the data path timing violation. FIG. 11 shows a logic circuit 300 adapted to generate stimuli and check the data path timing between two consecutive flip-flop 160 and 170, in accordance with one embodiment of the present disclosure.

The data input to flipflop 160 is received from multiplexer 162. Logic elements connected to the data input terminal D of flip-flop 160, collectively shown as fan-in logic block 164, are rerouted to the input terminal S1 of the multiplexer during timing violation check. Input S2 of MUX is connected to the stimuli sequence generator 166. Selecting between the normal mode of operation (i.e., emulation of the DUT to verify its functionality) and the test mode (i.e., detecting timing violation in accordance with the present disclosure) is achieved by programming register 168 via a writeback operation.

When the select terminal of multiplexer 162 is set to e.g., a low logic level, input data from fan-in logic 164 is connected to flip-flop 160 to enable the normal mode of operation. When the select terminal of multiplexer 162 is set to e.g., a high logic level, input data from stimuli sequence generator 166 is connected to flip-flop 160 to enable the detection of possible timing violations. Although not shown, combinational logic 165—disposed between flip-flops 160 and 170—is converted to a chain of buffers or inverters as described above.

The logic value applied to the select terminal of multiplexer 162 is set by flip-flop 168. Because the data input and output terminals of flip-flop 168 are connected to one another, flip-flop 168 supplies the same output value during each transition of its clock clk. The output value of flip-flop 168 is changed using a write-back operation, as described above.

To check the path timing between flip-flops 160 and 170, in accordance with one embodiment, an alternating sequence of 1s and 0s may be applied via stimuli sequence generator 166. Stimuli sequence generator 166 may, for example, be a shift register initialized with an alternating pattern of 1s and 0s (0101 . . . or 1010 . . . ) using either a write back or a signal generator. Logic circuit 300 is also shown as including a validation circuit 200. As is seen from FIG. 11, the same clock signal clk is applied to sequence generator 166, flip-flops 160, 170, 168 as well as flip-flops 204 and 208 disposed in validation logic 200, described further below.

FIG. 12 is a block diagram of a stimuli sequence generator 166, in accordance with one embodiment. Flip-flop 210 is initialized to a known value (0 or 1) using writeback. The output of flip-flop 210 (also referred to herein as register) is connected to its input via inverter 215. Accordingly, with each transition of clock signal clk, the output value Q of flip-flop 210 varies between 1 and 0, thereby to generate an alternating sequence of ones and zeroes.

Validation logic 200, which is adapted to record timing errors, is shown as including, flip-flops 204, 208, inverter 206 and XOR gate 202. Flip-flop 204 and inverter 206 form a stimuli generator as described above with reference to FIG. 12. During each cycle of clock clk, the output of flip-flop 204, delivered to XOR 216, is the data expected to propagate from flip-flop 160 to flip-flop 170. If the data propagating from flip-flop 160 to flip-flop 170 is different from the data supplied at the output Q of flip-flop 204, a transition occurs at the clock terminal of flip-flop 208 thus causing flip-flop 208 to have a locked output value of 1, representative of a timing violation and indicative of an error flag.

As described above, the timing violation test includes an initialization phase, a determination of the number of emulation cycles (EC) defined by N periods of the clocks applied to the flip-flops pair that are separated by a combinational logic, where N is the length of the input sequence, and the reading of the error flag values. During the initialization phase, flip-flops 160 and 170 are set in the order opposite to the input sequence such that if the input sequence is, for example, 1010 . . . , flip-flop 160 is set to 0 and flip-flop 170 is set to 1. Flip-flop 204 is initialized with the same value as flip-flop 170, and flip-flop 208 is initialized to 0 (i.e., no error). During the test mode, a 0 at the output of flip-flop 208 indicates that no timing violation exists in the path between flip-flops 160 and 170, whereas a 1 at the output of flip-flop 208 indicates that a timing violation exists in the path between flip-flops 160 and 170. The stimuli generator may be shared between multiple chains. Flip-flop 168 may also be shared between all paths being concurrently checked.

Figure 13:
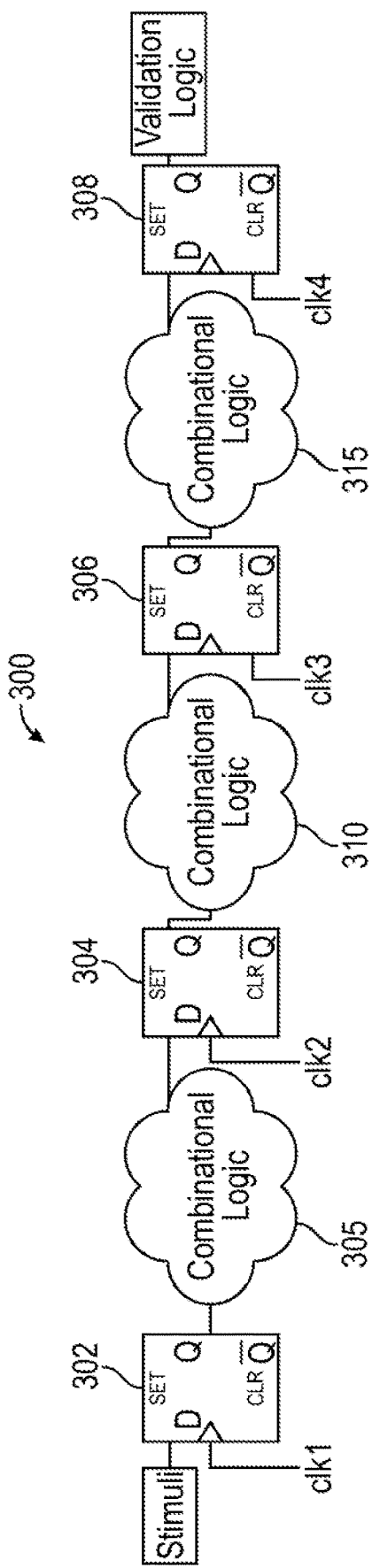
FIG. 13 shows a multitude of signal paths stitched together, in accordance with one embodiment of the present disclosure.

To minimize the overhead introduced by the instrumentation logic, multiple chains may be stitched together to form a larger chain as shown in FIG. 13 and described further below. One advantage of generating the stimuli is its accuracy. When the input sequences are relatively long, the probability of missing a small timing violation is small. Further, to the extent that stimuli generation requires writeback execution only in the initial test cycle, it provides enhanced performance. If a timing violation is detected in a long chain of flip-flops, the writeback/readback technique, as described herein, may be applied to narrow down the problematic segment.

Stitching Chains

In some embodiment, different timing paths may be stitched together to form a larger path/chain. For simplicity, only the stitching of flip-flop chains is described herein. It is understood, however, that stitching of latches may also be achieved using the same technique.

Flip flop chains may be stitched together if the timing budgets of their paths are substantially the same. To build longer chains, segments corresponding to intra-FPGA may also be added to the chain. For example, referring to FIG. 13, the path between flip-flops 302 and 304, as well as the path between flip-flops 306, 308 are assumed to be inter-FPGA paths, whereas the path between flip-flops 304 and 306 is assumed to be an intra-FPGA path. As seen, in accordance with one aspect of the present disclosure, the paths between flip-flops 302, 304, 306, 308 are stitched together to form chain 300.

Figure 14:
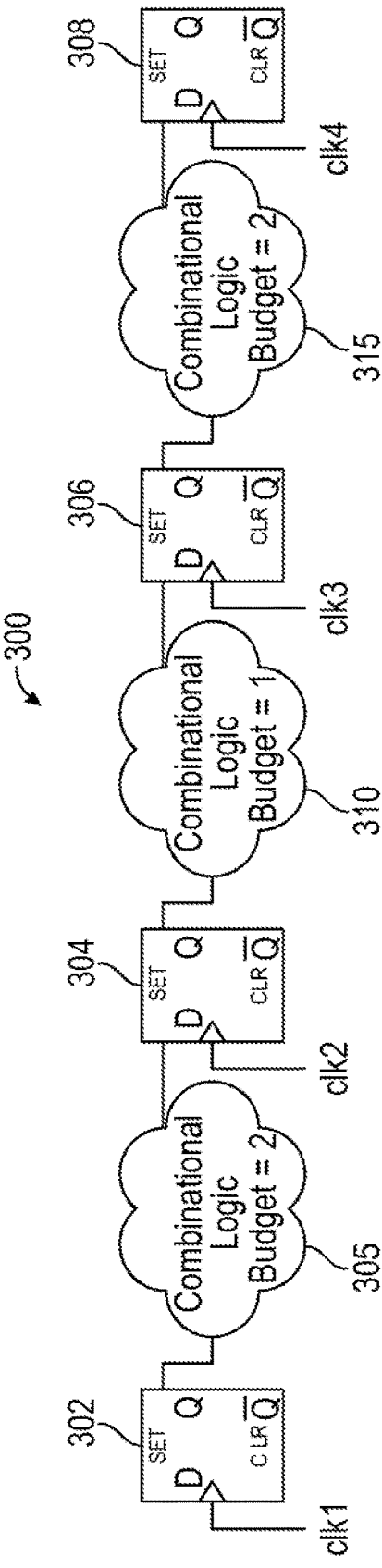
FIG. 14 shows a multitude of signal paths stitched together, in accordance with one embodiment of the present disclosure.

Since timing violations do not often occur in intra-FPGA segments, path stitching may be performed even if the timing budget of some of the intra-FPGA path segments is smaller than the timing budget of inter-FPGA path segments of the chain. When paths are stitched together as shown in FIG. 13, the clock patterns generated for the chain should match the time budget of the inter-FPGA segments. FIG. 14 shows the same concatenation (stitching) of flip-flop chains of FIG. 13 in which the combinational logic 305 and 315 are assumed to have the same time budget of 2 EC cycles. The paths between flip-flops 302/304 and 306/308 are concatenated (stitched) via intra-FPGA flip-flops 304/306 assumed to have a time budget of 1 or 2 EC cycles. Clock signal clk1, clk2, clk3 and clk4 respectively applied to flip-flops 302, 304, 306, 308 are assigned the same pattern corresponding to the period of 2 EC cycles.

Compile Time Analysis

Compile time analysis includes timing path enumeration, timing path partitioning, path stitching, and stimuli generator insertion. Timing path enumeration involves the identification of all data paths whose timing has to be checked, as described above. During timing path partitioning, all selected paths may be grouped according to their time budget. Path stitching involves stitching paths that have the same timing budget. For each stitched path or a group of stitched paths having the same time budget, a stimuli generator and validation logic are formed and applied, as described above. To minimize the number of runtime timing violations checks, the number of paths that are stitched may be kept to a relatively small number. The stitching of the paths may be extended in both directions.

Run Time Flow

Different tests for different stitched path may prepared at the compile time and run consecutively. To compress the tests, in one embodiment, pairwise disjoint stitched paths may be bundled together with the same clock pattern. For each test, clocks for a given time budget for all sequential elements in the paths are generated. Next, the combinational logic blocks in the paths are reprogrammed into buffer chains. The number of EC clock cycles for emulation are set to a value that is at least twice as large as the length of the longest path. Each path is subsequently programmatically simulated to generate the expected results. The emulation is then run for the selected number of EC clock cycles. Thereafter, the error indicators are checked using readback to report a timing violation for each path that has an error flag. In some embodiments, the above steps may be modified by splitting an offending path into individual inter-FPGA segments and applying the readback/writeback operation, as described above.

Figure 15:
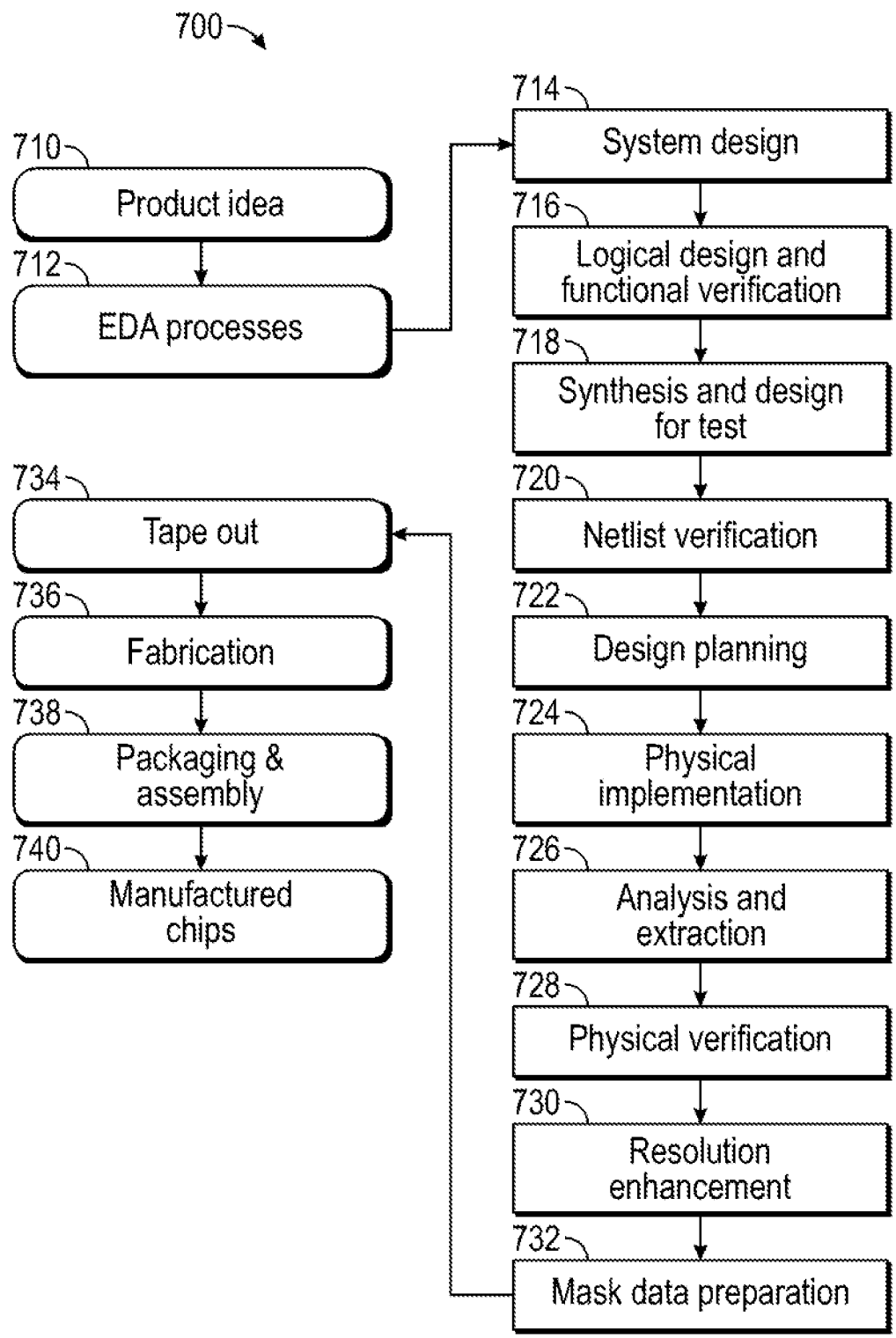
FIG. 15 shows a flowchart of various processes used during the design and manufacture of an integrated circuit in accordance with some embodiments of the present disclosure.

FIG. 15 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 15. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 16:
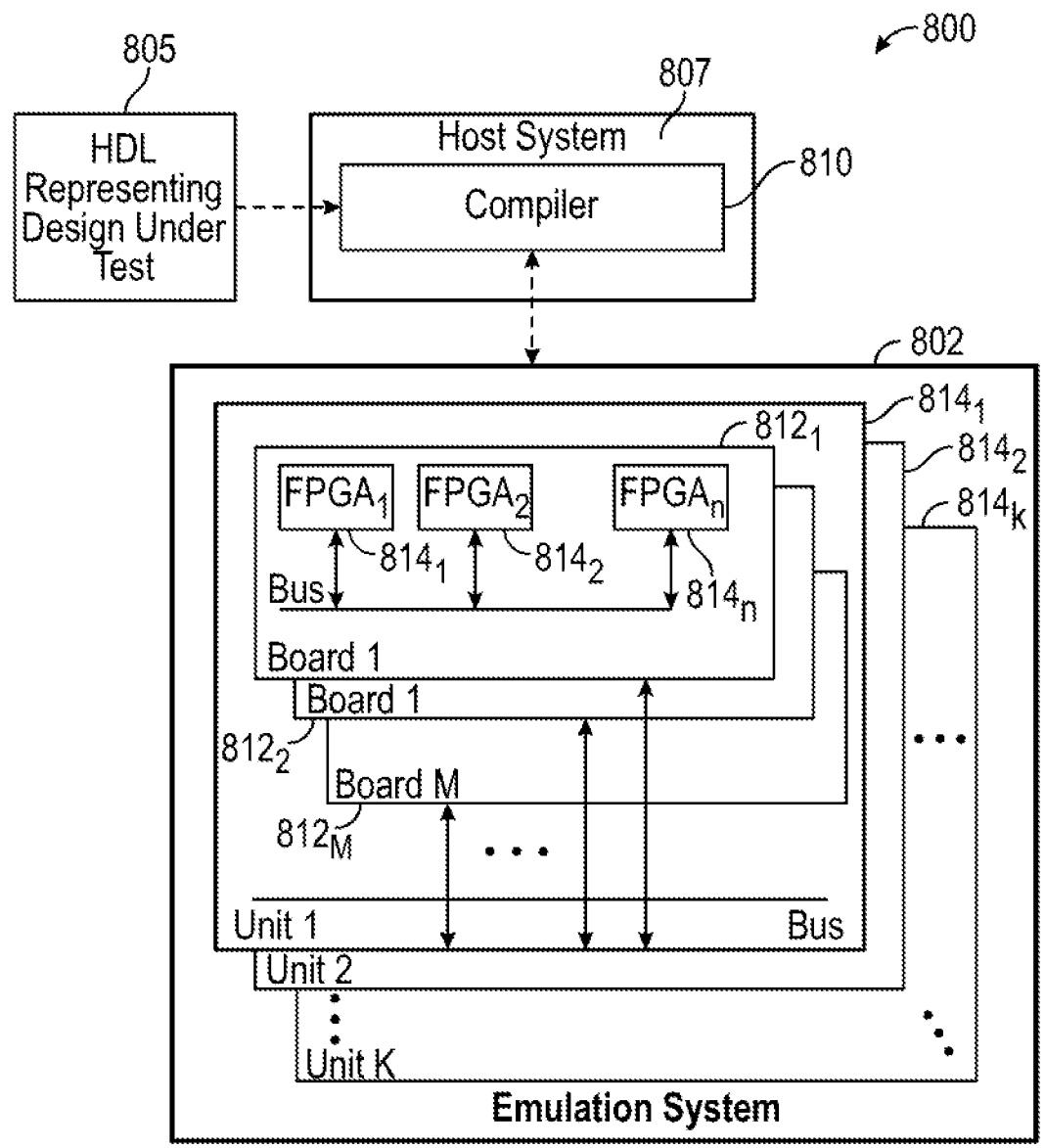
FIG. 16 shows a diagram of an example emulation system in accordance with some embodiments of the present disclosure.

FIG. 16 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other levels of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 17:
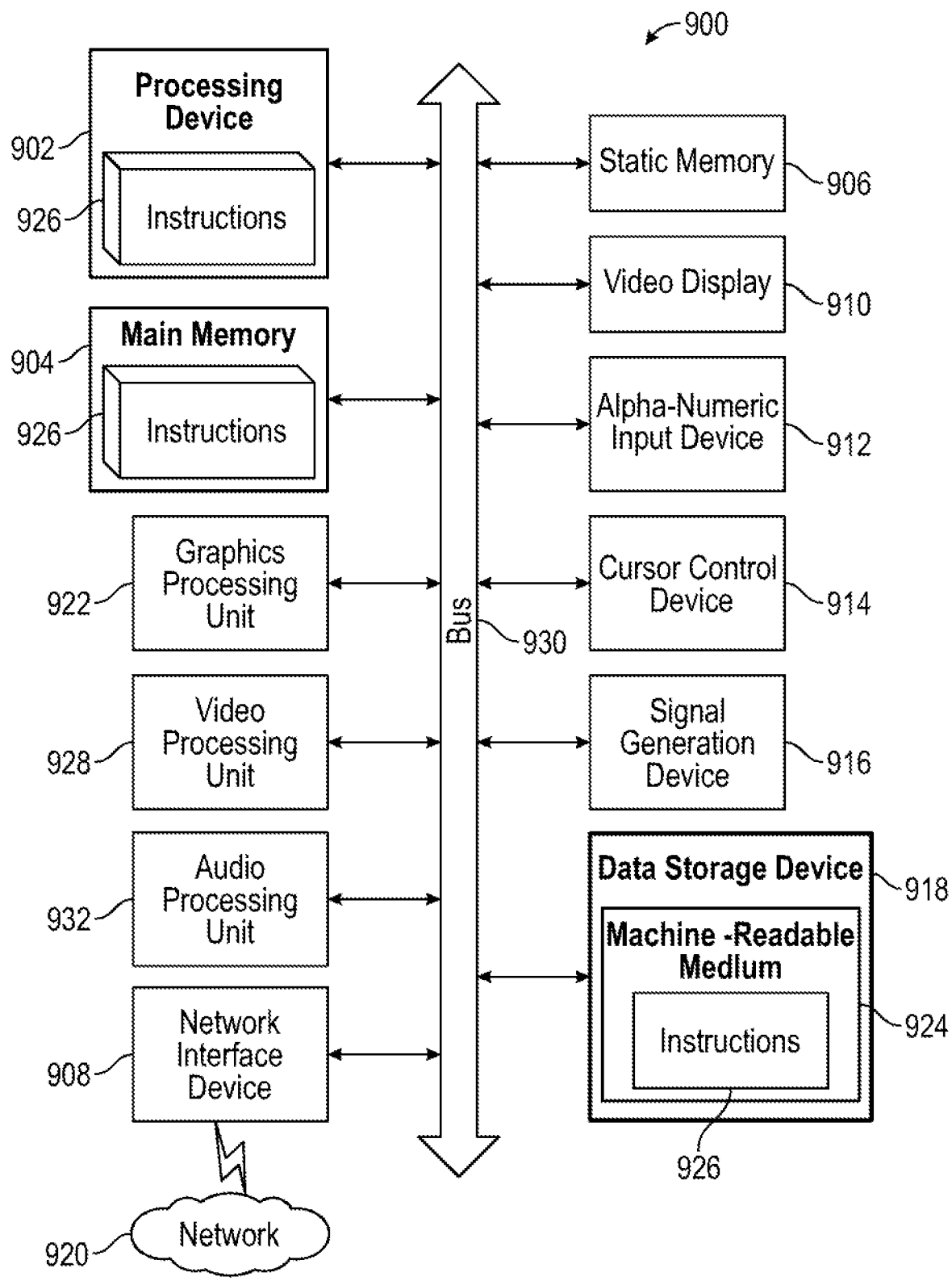
FIG. 17 shows a diagram of an example computer system in which embodiments of the present disclosure may operate.

FIG. 17 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of detecting a timing violation between a first sequential element and a second sequential element in a circuit design being emulated in a hardware emulation system, the method comprising:
   determining a timing relationship between first and second clocks applied respectively to the first sequential element and the second sequential element;
   reconfiguring a combinational logic disposed between the first sequential element and the second sequential element as one or more buffers;
   setting a delay across the one or more buffers to one or more clock cycles of the hardware emulation system based on the timing relationship;
   reprogramming the first and second clocks in accordance with the delay; and
   detecting a timing violation if a change in an output of the first sequential element is not stored in the second sequential element based on the reprogrammed first and second clocks.

2. The method of claim 1 further comprising:
   setting the delay across the one or more buffers to one cycle of the hardware emulation system clock if the first and second clocks are not synchronous with respect to one another and each of the first and second clocks has a period of at least one emulation clock period; and
   setting the delay across the one or more buffers to two cycles of the hardware emulation system clock if the first and second clocks are synchronous with respect to one another.

3. The method of claim 2 further comprising:
   setting the delay across the one or more buffers to one cycle of the hardware emulation system clock if the first and second clocks are independent clocks; and
   setting the delay across the one or more buffers to two cycles of the hardware emulation system clock if the first and second clocks are a same clock.

4. The method of claim 3 further comprising:
   setting the delay across the one or more buffers to N cycles of the hardware emulation system clock, wherein N is a period of the first clock and the second clock defined in terms of a number cycles of the hardware emulation system clock, wherein N is an integer greater than one, wherein the first and second clocks are synchronous with respect to one another.

5. The method of claim 4 further comprising:
reprogramming both the first clock and the second clock so that both the first clock and the second clock have a period defined by the delay.

6. The method of claim 5 further comprising:
reprogramming both the first clock and the second clock so that both the first clock and the second clock have a same pattern with low phases defined by K cycles of the hardware emulation system clock and high phases defined by (M-K) cycles of the hardware emulation system clock if the delay is set to M cycles of the hardware emulation system clock, wherein M is an integer greater than one, and K is a positive integer smaller than M.

7. The method of claim 6 further comprising:
setting output values of the first and second sequential elements using a write-back operation; and
reading the output value of the second sequential element using a read-back operation.

8. The method of claim 7 further comprising:
reconfiguring a first look-up table disposed between the first and second sequential elements as one or more buffers.

9. The method of claim 8 further comprising:
reconfiguring a second look-up table connected to a data input terminal of the first sequential element as either a logic 1 or a logic 0.

10. The method of claim 8 further comprising:
inserting a buffer between a second look-up table and the first sequential element if the second look-up table is configured to supply data to a data input terminal of the first sequential element and to receive data from the combinational logic.

11. The method of claim 1 wherein said hardware emulation system comprises a plurality of field-programmable gate arrays (FPGA).

12. The method of claim 11 wherein the first sequential element is disposed in a first one of the plurality of FPGAs and wherein the second sequential element is disposed in a second one of the plurality of FPGAs.

13. A non-transitory computer readable medium comprising stored instructions, which when executed by a processor, cause the processor to:
   determine a timing relationship between first and second clocks applied respectively to the first sequential element and the second sequential element;
   reconfigure a combinational logic disposed between the first sequential element and the second sequential element as one or more buffers;
   set a delay across the one or more buffers to one or more clock cycles of the hardware emulation system based on the timing relationship;
   reprogram the first and second clocks in accordance with the delay; and
   detect a timing violation if a change in an output of the first sequential element is not stored in the second sequential element based on the reprogrammed first and second clocks.

14. The non-transitory computer readable medium of claim 13 wherein said instructions further cause the processor to:
   set the delay across the one or more buffers to one cycle of the hardware emulation system clock if the first and second clocks are not synchronous with respect to one another and each of the first and second clocks has a period of at least one emulation clock period; and
   set the delay across the one or more buffers to two cycles of the hardware emulation system clock if the first and second clocks are synchronous with respect to one another.

15. The non-transitory computer readable medium of claim 14 wherein said instructions further cause the processor to:
   set the delay across the one or more buffers to one cycle of the hardware emulation system clock if the first and second clocks are independent clocks; and
   set the delay across the one or more buffers to two cycles of the hardware emulation system clock if the first and second clocks are a same clock.

16. The non-transitory computer readable medium of claim 15 wherein said instructions further cause the processor to:
   set the delay across the one or more buffers to N cycles of the hardware emulation system clock, wherein N is a period of the first clock and the second clock defined in terms of a number cycles of the hardware emulation system clock, wherein N is an integer greater than one, wherein the first and second clocks are synchronous with respect to one another.

17. The non-transitory computer readable medium of claim 16 wherein said instructions further cause the processor to:
reprogram both the first clock and the second clock so that both the first clock and the second clock have a period defined by the delay.

18. The non-transitory computer readable medium of claim 17 wherein said instructions further cause the processor to:
reprogram both the first clock and the second clock so that both the first clock and the second clock have a same pattern with low phases defined by K cycles of the hardware emulation system clock and high phases defined by (M-K) cycles of the hardware emulation system if the delay is set to M cycles of the hardware emulation system clock, wherein M is an integer greater than one, and K is a positive integer smaller than M.

19. The non-transitory computer readable medium of claim 18 wherein said instructions further cause the processor to:
reconfigure a first look-up table disposed between the first and second sequential elements as one or more buffers.

20. The non-transitory computer readable medium of claim 19 wherein said instructions further cause the processor to:
reconfigure a second look-up table connected to a data input terminal of the first sequential element as either a logic 1 or a logic 0.

* * * * *